Dec. 28, 1943.　　　　J. H. LEWIS　　　　2,337,757
COMPOUND GLASS SHEET
Filed Nov. 25, 1938
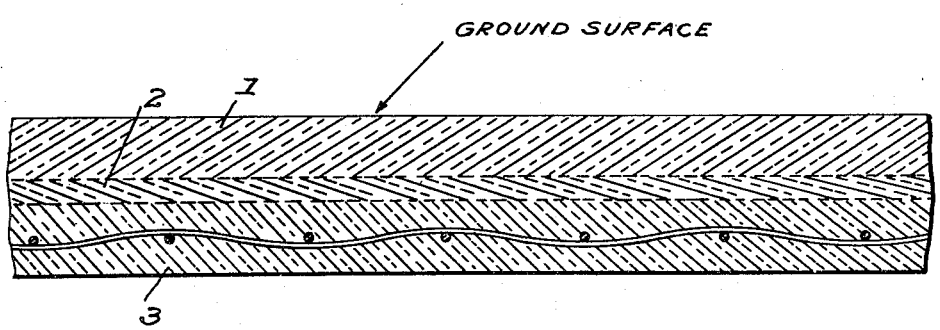
Inventor
JOSEPH H. LEWIS
By Dorsey Cole & Garner
Attorneys

UNITED STATES PATENT OFFICE 2,337,757

COMPOUND GLASS SHEET

Joseph H. Lewis, Kingsport, Tenn., assignor to Blue Ridge Glass Corporation, Kingsport, Tenn., a corporation of New York Application November 25, 1938, Serial No. 242,425

3 Claims. (Cl. 35—66)

This invention has for its object to provide a reenforced sheet of glass of substantial thickness in which the reenforcement is shielded from view from one side and which has a short annealing time whereby it may be annealed in tunnel lehrs now in common use for sheet glass. Such a sheet to my knowledge has not heretofore been devised; for while reenforced sheets of opaque glass have been made, the heat diffusion rate of such glass is so long as to require a long annealing time.

The glass sheet made in accordance with this invention, when one of its surfaces is matted, has value as a blackboard and consists essentially of three layers of glass welded together, the central layer being opaque and the outer layers transparent (including thereby translucent), with a wire reenforcement imbedded in the compound sheet, which reenforcement will be hidden from view from one or both sides of the sheet, dependent on whether the reenforcement is one of the transparent layers or in the opaque layer. As, however, it is desirable to reduce the annealing time, it is preferred that the opaque layer be as thin as possible and, therefore, it is preferable to imbed the reenforcement in one of the exterior transparent layers, in which case, if the sheet is to be used as a blackboard, the exposed surface of the other layer is matted.

The accompanying drawing is a section through a sheet embodying my invention and illustrates a sheet composed of three layers of glass, 1, 2 and 3, welded together, and preferably in the process of rolling them. The two outer layers, 1 and 3, are of glass having a relatively high heat diffusivity such as transparent glass, while the middle layer 2 is of opaque glass and therefore of low heat diffusivity. A wire reenforcement 4 is shown imbedded in one of the transparent layers 3 to strengthen the compound sheet and the surface of layer 1 is ground and, if the sheet is to be used as a blackboard, is matted.

For the use contemplated, the aggregate thickness of the several layers of the sheet after rolling and before grinding should be about three-eighths of an inch and the aggregate thickness of the layers 1 and 2 should be enough to permit the sheet to be ground to a plain surface without cutting through the opaque layer. In order to shorten the annealing time, the opaque layer 2 is preferably made as thin as it may be conveniently rolled while remaining opaque. The balance of the thickness of the compound sheet is made up by the layer 3 and this gives the necessary thickness of such layer to properly receive the wire reenforcement 4. The several layers 1, 2 and 3 should have approximately the same coefficient of thermal expansion.

A compound sheet such as above described may be rolled on known apparatus but I prefer to use for this purpose the mechanism shown in my Patent Number 2,261,262 in that such mechanism permits the formation of an opaque layer of small thickness.

It will be seen that by the construction described I have provided a reenforced opaque sheet of glass not containing any organic material and of which the opaque glass of low diffusivity forms only a small part of the total thickness so that the annealing time is kept down.

Having thus described my invention what I claim is:

1. A blackboard including a sheet of glass consisting of two outer layers of high heat diffusivity and an inner layer of opaque glass of low heat diffusivity, the layers being welded together and the sheet having a wire reenforcement imbedded therein.

2. A blackboard including a sheet of glass consisting of two outer layers of high heat diffusivity glass and an inner layer of opaque glass of low heat diffusivity, the layers being welded together and having a wire reenforcement imbedded in one of the outer layers.

3. A blackboard including a sheet of glass consisting of two outer layers of high heat diffusivity glass and an inner layer of opaque glass of low heat diffusivity, the layers being welded together and having a wire reenforcement imbedded in one of the outer layers, and having the surface of the other outer layer ground to a matte finish.

JOSEPH H. LEWIS.